July 10, 1934. A. M. MALLUK 1,965,777
PROTECTION MEANS FOR TANK CLOSURES
Original Filed Feb. 21, 1930
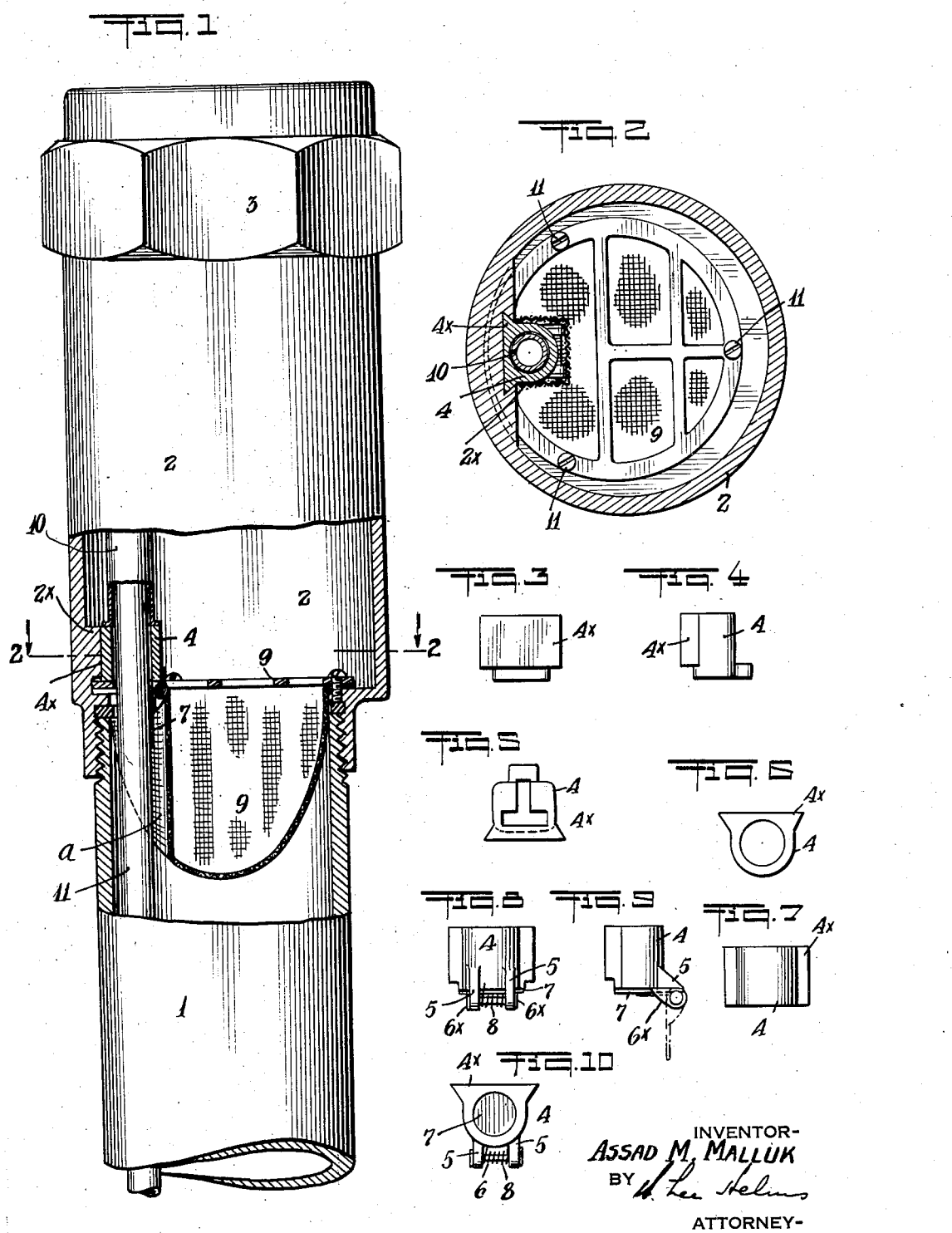
INVENTOR-
ASSAD M. MALLUK
BY
ATTORNEY- Patented July 10, 1934

1,965,777

UNITED STATES PATENT OFFICE 1,965,777

PROTECTION MEANS FOR TANK CLOSURES

Assad M. Malluk, New York, N. Y., assignor to Standard Lock and Measure Corporation, New York, N. Y., a corporation of New York Original application February 21, 1930, Serial No. 430,153. Divided and this application February 6, 1933, Serial No. 655,441

2 Claims. (Cl. 220—86)

The principal object of the present invention is to provide fire protection means for tank closures so constructed that the contents of the tank may be gauged notwithstanding the presence of the fire protection means, the filler opening being mounted in protected condition. Not only is the filler opening provided with a fire means, but is associated with a protection plate and with a measuring rod guide provided with a shutter which closes its base upon the removal of a gauge rod, the protection plate preventing the breaking of the screen by contact with the filler nozzle.

This application is a division of my co-pending application filed February 21, 1930, Serial No. 430,153.

The invention will be described with reference to the accompanying drawing, in which Fig. 1 is an elevation of an embodiment of the invention, partly broken away.

Fig. 2 is a horizontal section on the line 2—2, Fig. 1.

Figs. 3 and 4 are, respectively, rear and side elevations of a gauge rod guide embodiment.

Fig. 5 is a plan view thereof.

Figs. 6 and 7 are, respectively, plan and front elevations of a modified form of gauge rod guide.

Figs. 8 and 9 are, respectively, front and side elevations of the gauge rod guide shown in Figs. 5 and 6, having applied thereto an automatic shutter.

Fig. 10 is a plan view of the structure shown in Fig. 8.

In the drawing, I have shown at 1 a filler pipe leading to a tank for containing liquids and at 2 an enlarged extension thereof, the two members being threaded together, extension 2 having a removable cap 3.

Within the member 2 is mounted a gauge rod guide 4, a thickened wall $2x$ being formed with a dove-tailed vertical recess to receive the correspondingly formed face $4x$ of the latter.

The gauge rod guides may have various forms of rod-receiving openings to correspond with various forms of rods. In Fig. 5 the opening is T-shaped and in Figs. 6 and 10 the opening is round.

In Figs. 8, 9 and 10, the gauge rod guide is formed with spaced lugs 5 to receive a pivot stud 6 passed through ears $6x$ extending from a shutter plate 7 which normally closes the base of the gauge rod guide.

A spring 8 encircles the stud 6 and has one end thereof pressing upon the shutter and its opposite end pressing upon the side of the gauge as shown more particularly in Fig. 1, so that the spring serves to maintain the shutter in closed position.

The gauge rod guide 4 with its shutter 7 is associated with a fire screen 9, and co-acts directly with the said screen. Screen 9 is applied to the lower horizontal wall of member 2 by being bent over at its upper margin upon said wall, and the screen is held in place by a protection plate 10 which receives screws 11 threaded in said wall. Underlying thickened area $2x$, member 2 has formed therein a channel to receive the closure plate. The screen is bent to form a vertical channel below and partially around the gauge rod guide, at the base of the latter, the channel being indicated at $a$, Fig. 1.

Extension 2 may be provided with a guide sleeve 10 in register with the gauge rod guide, as shown in Fig. 1. When a gauge rod, for example, gauge rod 11, Fig. 1, is moved downwardly through the gauge rod guide, it will swing shutter 7 on its axis against the tension of spring 8 and the rod may then be moved downwardly to the base of the tank for gauging its contents.

When the rod is moved upwardly above the guide, shutter 7 will be moved back to closed position. In this manner, the filler opening will be protected by the joint action of the fire screen 9 and the shutter 7.

It will be understood that the gauge rod guide and fire screen 9 may be mounted separately from the filler pipe 1, as, for example, in a member such as a bushing or the like, for application to the filler pipe in a manner other than shown in the specific embodiment illustrated in the drawing.

Having described my invention, what I claim, and desire to secure by Letters Patent, is as follows:—

1. In protection devices for filler pipes of tanks and the like, a tubular member adapted to be secured to the upper portion of a filler pipe and having an inwardly projecting seat, a fire screen having its margins bent over upon the said seat and having a marginal portion thereof bent inwardly to form a passageway for a gauge rod, a grid-like protection plate mounted above the screen and secured to said seat thereby holding the screen in position, a gauge rod guide held by said tubular member in register with said passageway and a spring pressed shutter carried at the base of said gauge rod guide.

2. A device constructed in accordance with claim 1 in which the tubular member is formed with a vertical dove-tailed channel above said seat, the gauge rod guide being formed with a dove-tail whereby the guide may be removably held in said channel in register with the passageway of the screen and may be substituted by guides having various shapes of guide walls for gauge rods of various cross sections.

ASSAD M. MALLUK.